(12) United States Patent
Janson et al.

(10) Patent No.: US 9,625,019 B2
(45) Date of Patent: Apr. 18, 2017

(54) INFINITELY VARIABLE TRANSMISSION

(71) Applicant: Ford Global Technologies, LLC, Dearborn, MI (US)

(72) Inventors: David Allen Janson, Plymouth, MI (US); Donald Edward Hoffman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/831,906

(22) Filed: Aug. 21, 2015

(65) Prior Publication Data
US 2017/0051815 A1 Feb. 23, 2017

(51) Int. Cl.
F16H 37/00 (2006.01)
F16H 37/02 (2006.01)

(52) U.S. Cl.
CPC .................... F16H 37/022 (2013.01)

(58) Field of Classification Search
None
See application file for complete search history.

(56) References Cited

U.S. PATENT DOCUMENTS

| | | | | |
|---|---|---|---|---|
| 3,340,749 A | * | 9/1967 | Schreiner | F16H 37/0846 475/211 |
| 5,453,061 A | * | 9/1995 | Fellows | F16H 37/086 475/215 |
| 5,755,303 A | | 5/1998 | Yamamoto et al. | |
| 5,876,299 A | * | 3/1999 | Kim | F16H 37/0853 475/193 |
| 6,217,473 B1 | * | 4/2001 | Ueda | F16H 15/38 475/216 |
| 6,351,700 B1 | * | 2/2002 | Muramoto | B60W 10/02 477/39 |
| 6,436,001 B1 | * | 8/2002 | Sakai | F16H 61/6648 475/216 |
| 6,569,052 B2 | * | 5/2003 | Sakai | F16H 61/6648 475/214 |
| 6,659,901 B2 | * | 12/2003 | Sakai | F16H 37/084 475/208 |
| 7,077,777 B2 | * | 7/2006 | Miyata | F16H 37/086 475/208 |
| 7,935,014 B2 | | 5/2011 | Bachmann | |
| 8,376,889 B2 | * | 2/2013 | Hoffman | F16H 15/503 475/189 |
| 8,382,631 B2 | * | 2/2013 | Hoffman | F16H 37/0853 475/196 |

(Continued)

FOREIGN PATENT DOCUMENTS

WO 2014041326 A1 3/2014

*Primary Examiner* — Dirk Wright
(74) *Attorney, Agent, or Firm* — James Dottavio; Brooks Kushman P.C.

(57) ABSTRACT

A family of transmission gearing arrangements utilize one or two ball variators to establish a continuous range of speed ratios between an input and an output. In each case, the range of speed ratios includes an infinite ratio in which the output is stationary as the input rotates. In some embodiments having two ball variators, the outputs of the variators are combining using a planetary gear set. In other embodiments having two variators, the outputs of the variators are combined using clutches, which may be switchable one-way clutches.

16 Claims, 6 Drawing Sheets

(56) References Cited

U.S. PATENT DOCUMENTS

| | | |
|---|---|---|
| 8,562,464 B2 | 10/2013 | Yang |
| 8,574,110 B2 * | 11/2013 | Hoffman ............. F16H 37/0853 475/215 |
| 8,585,528 B2 * | 11/2013 | Carter .................... F16H 15/52 475/192 |
| 2011/0165986 A1 * | 7/2011 | Hoffman ............. F16H 37/0853 475/214 |

* cited by examiner

INFINITELY VARIABLE TRANSMISSION

TECHNICAL FIELD

This disclosure relates to the field of automatic transmissions for motor vehicles. More particularly, the disclosure pertains to arrangements of gearing and one or more ball variators in a transmission capable of operating at a zero output speed and positive non-zero input speed.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Some types of transmissions operate in a discrete number of different operating modes, each associated with a predetermined speed ratio between an input and an output. Such transmissions must periodically shift between the operating modes in order to adjust the speed ratio. Other types of transmissions, called Continuously Variable Transmissions (CVTs) are capable of establishing an infinite number of speed ratios within a predetermined range of speed ratios. CVTs are capable of making frequent, small adjustments to the speed ratio without discernable shift events. If the predetermined range of speed ratios does not include an infinite ratio (zero output speed combined with positive non-zero input speed), then some form of launch device is required in order to transition a vehicle from stationary to moving. If the predetermined range of speed ratios includes an infinite ratio, the transmission is called an Infinitely Variable Transmission (IVT).

CVTs, including IVTs, generally include a variator which includes a mechanism for adjusting the ratio of the speeds of two shafts to a desired value within some range. A CVT may include additional components that establish power flow paths among the two shafts, an input, and an output. The additional components may shift the ratio range of the transmission (between the input and the output) relative to the ratio range of the variator (between the two shafts). For example, the ratio range of the transmission may be wider than the ratio range of the variator.

Figure 1:
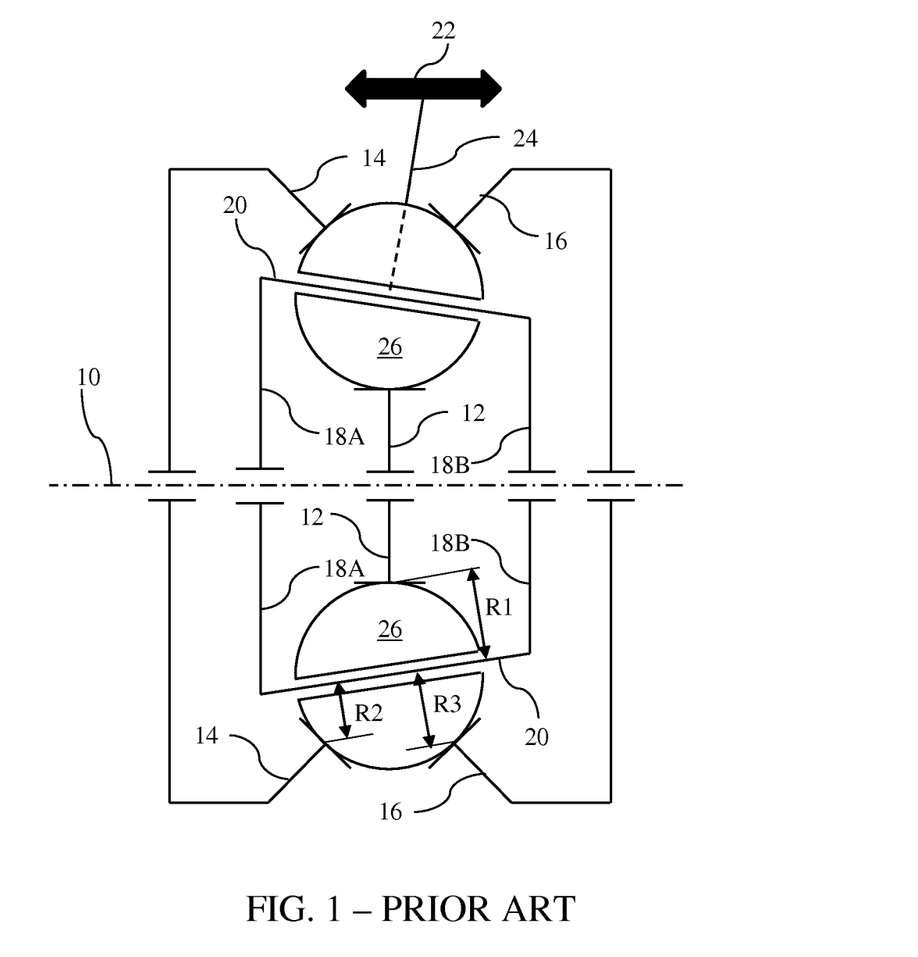
FIG. 1 is a schematic diagram of a ball variator.

FIG. 1 illustrates one type of variator called a ball variator. Four elements are supported for rotation about a central shaft 10, including an inner race 12, a left outer race 14, a right outer race 16, and a carrier 18. Since these components are essentially axi-symetric, they appear on both sides of the central axis 10 in a cross sectional depiction such as FIG. 1. Carrier 18 includes a left leg 18A and a right leg 18B. Several ball axles 20 extend between left leg 18A and right leg 18B at several circumferential locations. The ball axles 20 are connected to an actuator 22 by one or more rods 24, such that moving actuator 22 causes the axis of the ball axles 20 to rotate. For example, when actuator 22 is moved to the right as shown in FIG. 1, the right sides of the ball axles are closer to the central axis 10 than the left sides of the ball axles. Several balls 26 are supported for rotation about the ball axles 20. The inner race 12, left outer race 14, and right outer race 16 each contact each of the balls 26. The races are held against the balls with sufficient force to prevent substantial slipping at the contact points.

The ball variator constrains the relative speeds of the inner race 12, the left outer race 14, the right outer race 16, and the carrier 18. The radii, R1 through R3, of the contact points with respect to the ball axle axis is a function of the tilt angle of the ball axle. The speed difference between carrier 18 and inner race 12 is proportional to the rotational speed of ball 26 about the ball axle and proportional to R1. Similarly, the speed differences between carrier 18 and left outer race 14 and right outer race 16, respectively, are proportional to the speed of ball 26 and proportional to R2 and R3, respectively. The speed of carrier 18 is a weighted average of the speeds of inner race 12 and left outer race 14 with the weighting factors determined by the position of actuator 22. The speed of carrier 18 is also a weighted average of the speeds on inner race 12 and right outer race 16 although the weighting factors are different for all but one position of actuator 22.

SUMMARY OF THE DISCLOSURE

In a first embodiment, a transmission includes an input, an output, first and second gearing arrangements, and a first ball variator. The first gearing arrangement arrangement is configured to establish an underdrive speed ratio between the input and a first intermediate shaft. The first gearing arrangement may be, for example, a planetary gear set or a second ball variator. The first ball variator is configured to establish a continuous range of speed ratios between the input and a second intermediate shaft. The second gearing arrangement is configured to establish a linear speed relationship between the second intermediate shaft, the first intermediate shaft, and the output.

In a second embodiment, a transmission includes an input, first and second intermediate shafts, first and second ball variators, and a combining gearing arrangement. The first and second ball variators are each configured to establish a continuous range of speed ratios between the input and first and second intermediate shafts respectively. One or both ball variators may establish an infinite speed ratio in which the respective intermediate shaft is stationary while the input rotates. The combining gearing arrangement is configured to transfer power from the first and second intermediate shafts to an output. The combining gearing arrangement may be, for example, a planetary gear set or a clutch module.

In a third embodiment, a transmission includes an input, an output, and first and second ball variators. The first ball variator is configured to selectively establish a first continuous range of speed ratios between the input and the output. The first range of speed ratios includes an infinite speed ratio in which the output is stationary while the input rotates. For example, the first ball variator may have an inner race fixedly driveably connected to the input, a first outer race fixedly held against rotation, and a second outer race selectively driveably connected to the output via a first clutch. The second ball variator is configured to selectively establish a second continuous range of speed ratios between the input and the output overlapping with the first range of speed ratios. For example, the second ball variator may have an inner race fixedly driveably connected to the input, an outer race fixedly held against rotation, and a carrier selectively driveably connected to the output via a second clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. A discrete ratio transmission has a gearing arrangement that selectively imposes a variety of speed ratios between an input shaft and an output shaft.

A group of gearing elements are fixedly coupled to one another if and only if they are constrained to rotate at the same speed about the same axis in all operating conditions. Gearing elements can be fixedly coupled by spline connections, welding, press fitting, machining from a common solid, or other means. Slight variations in rotational displacement between fixedly coupled elements can occur such as displacement due to lash or shaft compliance. One or more gearing elements that are all fixedly coupled to one another may be called a shaft. In contrast, two gearing elements are selectively coupled by a shift element if and only if the shift element constrains them to rotate at the same speed about the same axis whenever the shift element is fully engaged and they are free to rotate at distinct speeds in at least some other operating condition. A shift element that holds a gearing element against rotation by selectively coupling it to the housing is called a brake. A shift element that selectively couples two or more gearing elements to one another is called a clutch. Shift elements may be actively controlled devices such as hydraulically or electrically actuated clutches or brakes or may be passive devices such as one way clutches or brakes. Two gearing elements are coupled if they are either fixedly coupled or selectively coupled.

Two gearing elements are fixedly driveably connected if a fixed proportional speed relationship is imposed between them with a predetermined finite speed ratio that is not necessarily equal to one. Similarly, two gearing elements are selectively driveably connected by a clutch if a proportional speed relationship is imposed between them with a predetermined finite speed ratio that is not necessarily equal to one whenever the clutch is fully engaged and the elements have a different speed ratio in some other operating condition.

Figure 2:
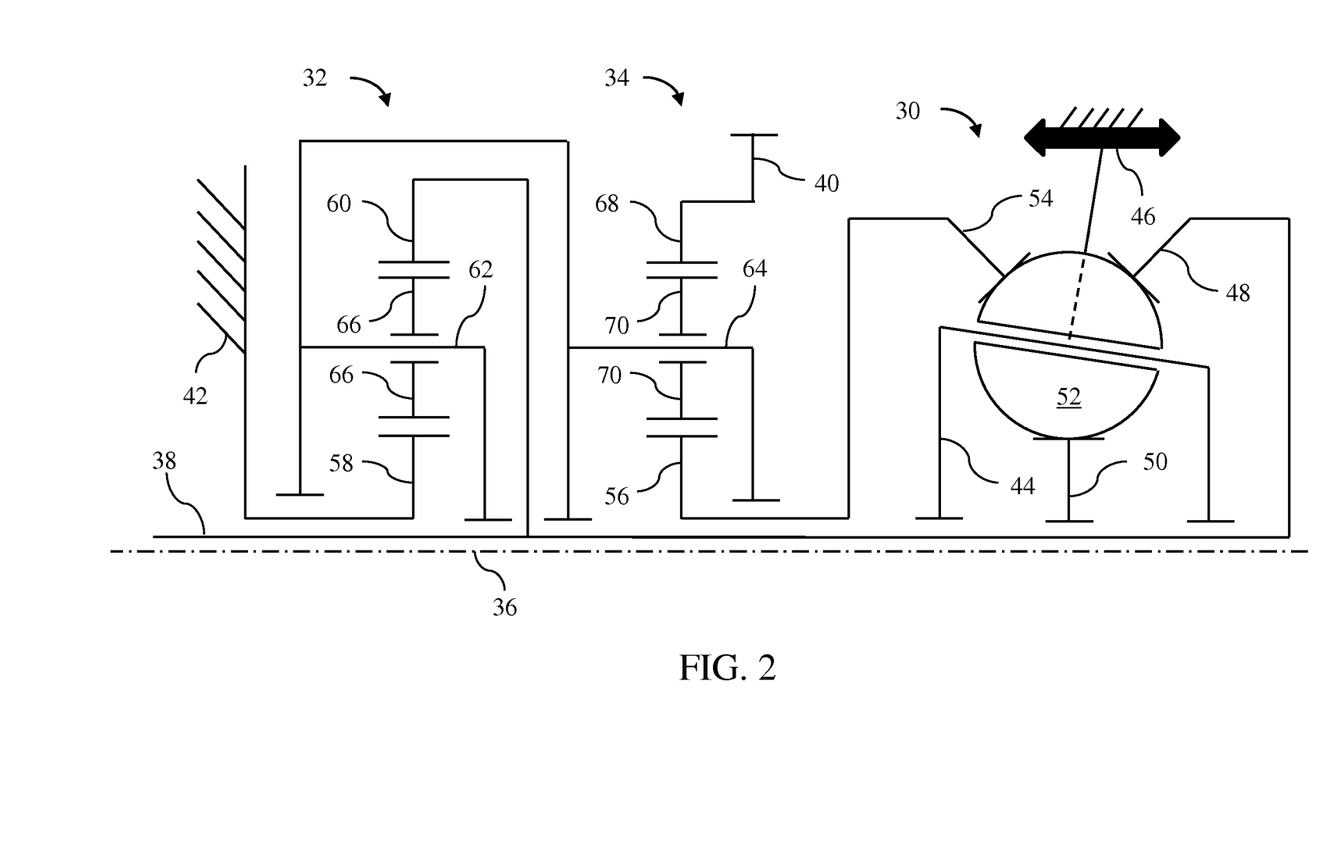
FIG. 2 is a schematic diagram of a first transmission gearing arrangement utilizing one ball variator and two planetary gear sets.

FIG. 2 illustrates a transmission gearing arrangement utilizing a ball variator 30, an underdrive gear set 32, and a combining gear set 34. The carriers and races of ball variator 30 and the sun gears, ring gears, and carriers of planetary gear set 32 and 34 are all supported for rotation about a common axis 36. Since the majority of the components are axi-symetric, only one half of the cross section is depicted in FIG. 2. Input 38 is driven by a power source such as an internal combustion engine. Output 40 drives the vehicle wheels via axis transfer gearing and a differential (not shown). The axis transfer gearing may include meshing gears and/or a chain and sprockets. The axis transfer gearing may provide additional speed reduction/torque multiplication. Additionally or alternatively, a planetary gear set may provide speed reduction/torque multiplication. The components are retained and supported by a transmission case 42 that is fixed to vehicle structure.

The carrier 44 and actuator 46 of ball variator 30 are supported such that they do not rotate with respect to transmission case 42. Right outer race 48 is fixedly coupled to input shaft 38. Inner race 50 is not coupled to other components, but provides a radial reaction force against balls 52. Left outer race 54 is fixedly coupled to sun gear 56 of combining planetary gear set 34. Sun gear 58 of underdrive gear set 32 is held against rotation by a fixed coupling to transmission case 42. Ring gear 60 of underdrive gear set 32 is fixedly coupled to input shaft 38. Carrier 62 of underdrive gear set 32 is fixedly coupled to carrier 64 of combining gear set 34. A plurality of planet gears 66 are supported for rotation with respect to carrier 62 and each mesh with both sun gear 58 and ring gear 60. Ring gear 68 of combining gear set 34 is fixedly coupled to output 40. A plurality of planet gears 70 are supported for rotation with respect to carrier 64 and each mesh with both sun gear 56 and ring gear 68.

Simple planetary gear sets, such as gear sets 32 and 34, establish a fixed linear speed relationship among the sun gear, the carrier, and the ring gear. Other types of devices, such as double planet gear sets, also establish fixed linear speed relationships among three elements. When the sun gear of a simple planetary gear set is held stationary, a fixed underdrive speed ratio is established between the ring gear and the carrier. For example, if ring gear 60 has twice as many gear teeth as sun gear 58, carrier 62 is constrained to rotate at ⅔ of the speed of input shaft 38. Ball variator 30 establishes a proportional speed relationship between input shaft 38 and left outer race 54 wherein the speed ratio between these elements varies based on the position of actuator 46. When the actuator is in the central position, left outer race rotates at the same speed as input 38. When the actuator is pushed to the right, as shown in FIG. 2, left outer race 54 rotates slower than input shaft 38. For example, at an extreme rightward position of actuator 46, left outer race 54 may rotate at half the speed of input shaft 38. Similarly, at an extreme leftward position of actuator 46, left outer race 54 may rotate at twice the speed of input shaft 38. Combining planetary gear set 34 establishes a fixed linear speed relationship among left outer race 54, carrier 62, and output 40. When left outer race 54 is slower than carrier 62, output 40 rotates faster than carrier 62. Conversely, when left outer race 54 is faster than carrier 62, output 40 rotates slower than carrier 62. By choosing suitable tooth numbers for the gears and suitable dimensions for the ball variator, output 40 rotates in the opposite direction of input shaft 38 when the actuator 46 is in its extreme leftward position.

When the vehicle is stationary, actuator 46 is positioned such that input shaft 38 is free to rotate without causing any rotation of output 40. In this condition, the engine can idle with the vehicle stationary. To cause the vehicle to move forward, actuator 46 is moved slightly to the right, causing left outer race 54 to slow relative to input shaft 38 which causes output 40 to rotate in the same direction as input shaft 38. As the vehicle speed increases, actuator 46 is moved further to the right such that the speed of input shaft 38 is less relative to the speed of output 40, allowing a relatively constant engine speed as the vehicle accelerates. In response to a driver demand for more power, actuator 46 may be moved to the left, increasing the engine speed relative to the vehicle speed which allows the engine to develop more torque and multiplies that torque. To cause the vehicle to move backward from a stationary condition, actuator 46 is moved slightly to the left, causing left outer race 54 to speed up relative to input shaft 38 which causes output 40 to rotate in the opposite direction as input shaft 38.

In an alternative embodiment, a controllable clutch may be inserted to convert one of the fixedly coupled relationships to a selectively coupled relationship. When the vehicle is stationary and drive is selected, the clutch is disengaged and actuator 46 is positioned slightly to the right of the position corresponding to zero output shaft speed. When the vehicle is stationary and reverse is selected, the clutch is disengaged and actuator 46 is positioned slightly to the left of the position corresponding to zero output shaft speed. To launch the vehicle, the clutch is gradually engaged. After launch, the clutch remains engaged and ratio adjustments are accomplished as described above.

Figure 3:
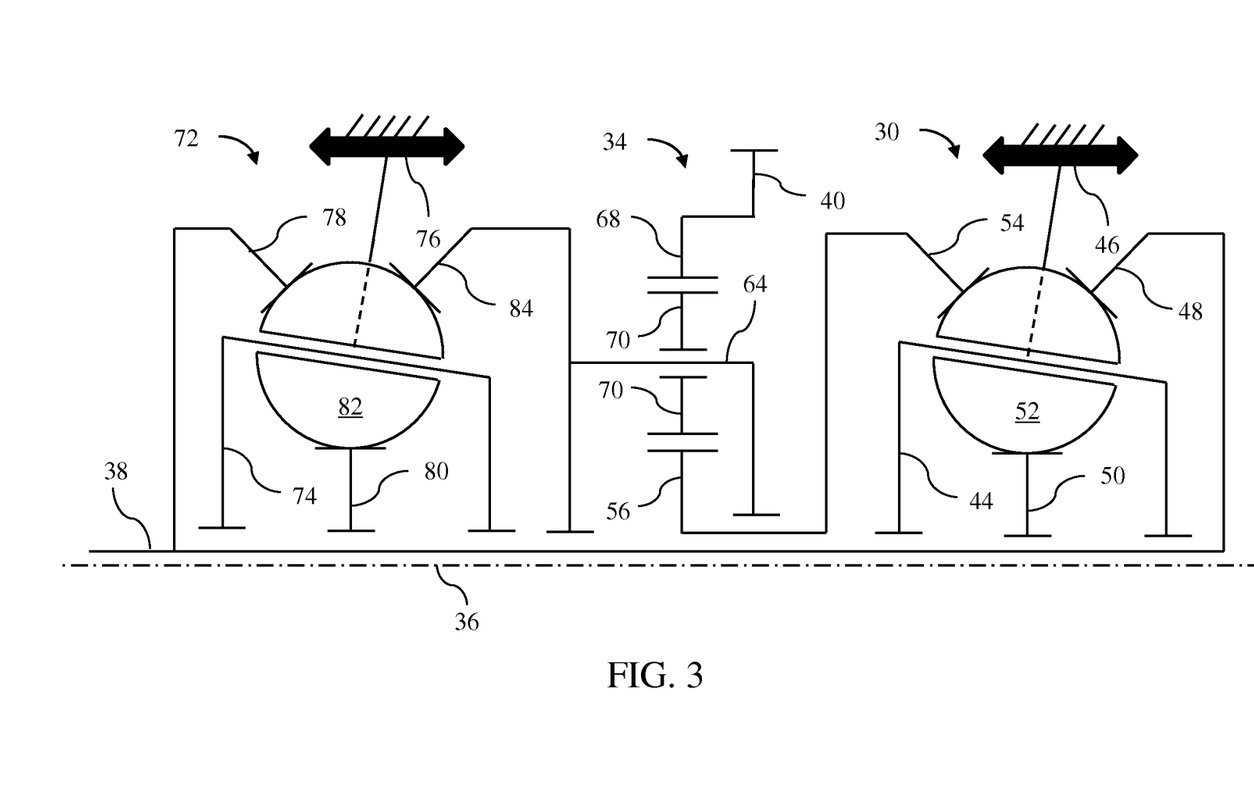
FIG. 3 is a schematic diagram of a second transmission gearing arrangement utilizing two ball variators and one planetary gear set.

FIG. 3 illustrates a transmission gearing arrangement utilizing two ball variators 30 and 72 and a combining gear set 34. Input shaft 38, ball variator 30, and combining gear set 34 are interconnected as in the arrangement of FIG. 2. The carrier 74 and actuator 76 of ball variator 72 are supported such that they do not rotate with respect to the transmission case. Left outer race 78 is fixedly coupled to input shaft 38. Inner race 80 is not coupled to other components, but provides a radial reaction force against balls 82. Right outer race 84 is fixedly coupled to carrier 64 of combining planetary gear set 34. Ball variator 72 establishes a proportional speed relationship between input shaft 36 and carrier 64 wherein the speed ratio between these elements varies based on the position of actuator 76. As in FIG. 2, output 40 drives the vehicle wheels via axis transfer gearing and a differential (not shown). Due to the expanded ratio capability of this arrangement relative to the arrangement of FIG. 2, a different final drive ratio may be preferred.

Operation of the arrangement of FIG. 3 is similar to operation of the arrangement of FIG. 2 except that both actuators 46 and 76 impact the speed ratio between input shaft 38 and output 40. Most desired overall speed ratios can be established by a large variety of combinations of actuator positions. The controller may select among these combinations using a predetermined map that approximates the most efficient combination for each overall speed ratio.

Figure 4:
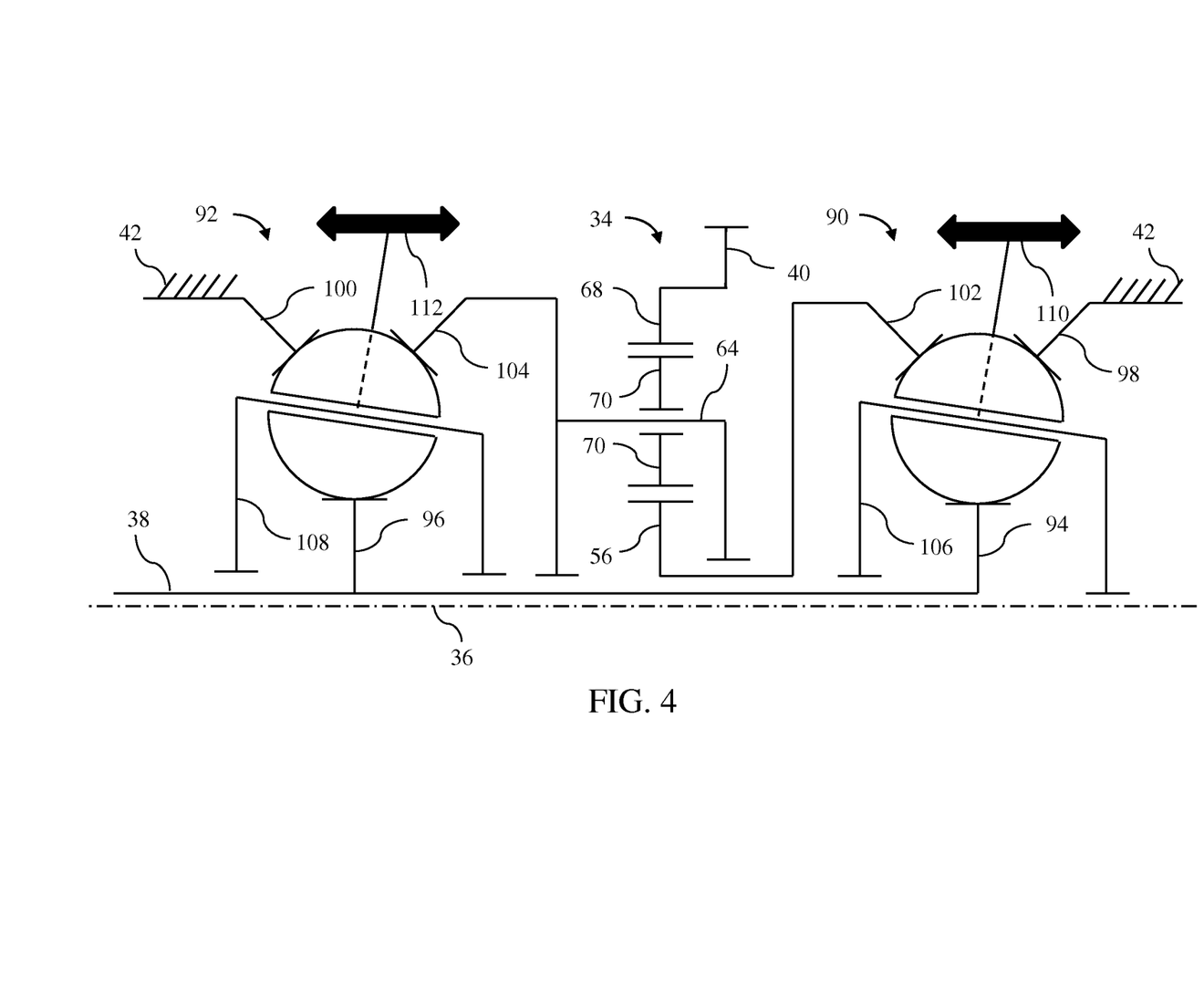
FIG. 4 is a schematic diagram of a third transmission gearing arrangement utilizing two ball variators and one planetary gear set.

FIG. 4 illustrates a transmission gearing arrangement utilizing two ball variators 90 and 92 and a combining gear set 34. Inner races 94 and 96 of ball variators 90 and 92 respectively are each fixedly coupled to input shaft 38. Right outer race 98 of ball variator 90 and left outer race 100 of ball variator 92 are fixedly coupled to transmission case 42. Left outer race 102 of ball variator 90 is fixedly coupled to sun gear 56 of combining gear set 34. Right outer race 104 of ball variator 92 is fixedly coupled to carrier 64 of combining gear set 34. Carriers 106 and 108 are supported for rotation about common axis 36 but are not coupled to one another or to other gearing elements. Since carriers 106 and 108 rotate, actuators 110 and 112 must act through an interface such as a fork and groove similar to the interface used to actuate manual transmission synchronizers.

Ball variator 90 establishes a proportional speed relationship between input shaft 36 and left outer race 102 wherein the speed ratio between these elements varies based on the position of actuator 110. When actuator 110 is in the central position, left outer race 102 is stationary. When the actuator is pushed to the right, as shown in FIG. 4, left outer race 102 rotates in the same direction as input shaft 38 at a slower speed than input shaft 38. For example, at an extreme rightward position of actuator 110, left outer race 102 may rotate at about one fifth the speed of input shaft 38. When the actuator is pushed to the left, left outer race 102 rotates in the opposite direction as input shaft 38. Similarly, moving actuator 112 to the left causes right outer race 104 to rotate in the same direction as input shaft 38 and moving it to the left causes right outer race to rotate in the opposite direction.

Operation of the arrangement of FIG. 4 is similar to operation of the arrangement of FIG. 3. An infinite overall ratio (output 40 stationary) may be established by setting both actuators 110 and 112 to the central position, or by offsetting each in opposite directions by appropriate amounts. Ratio adjustments may be accomplished by moving either actuator with actuator 112 having a greater ratio impact than the same amount of movement of actuator 110. Thus, actuator 112 may be used primarily for large adjustments and actuator 110 may be used primarily for fine tuning.

Figure 5:
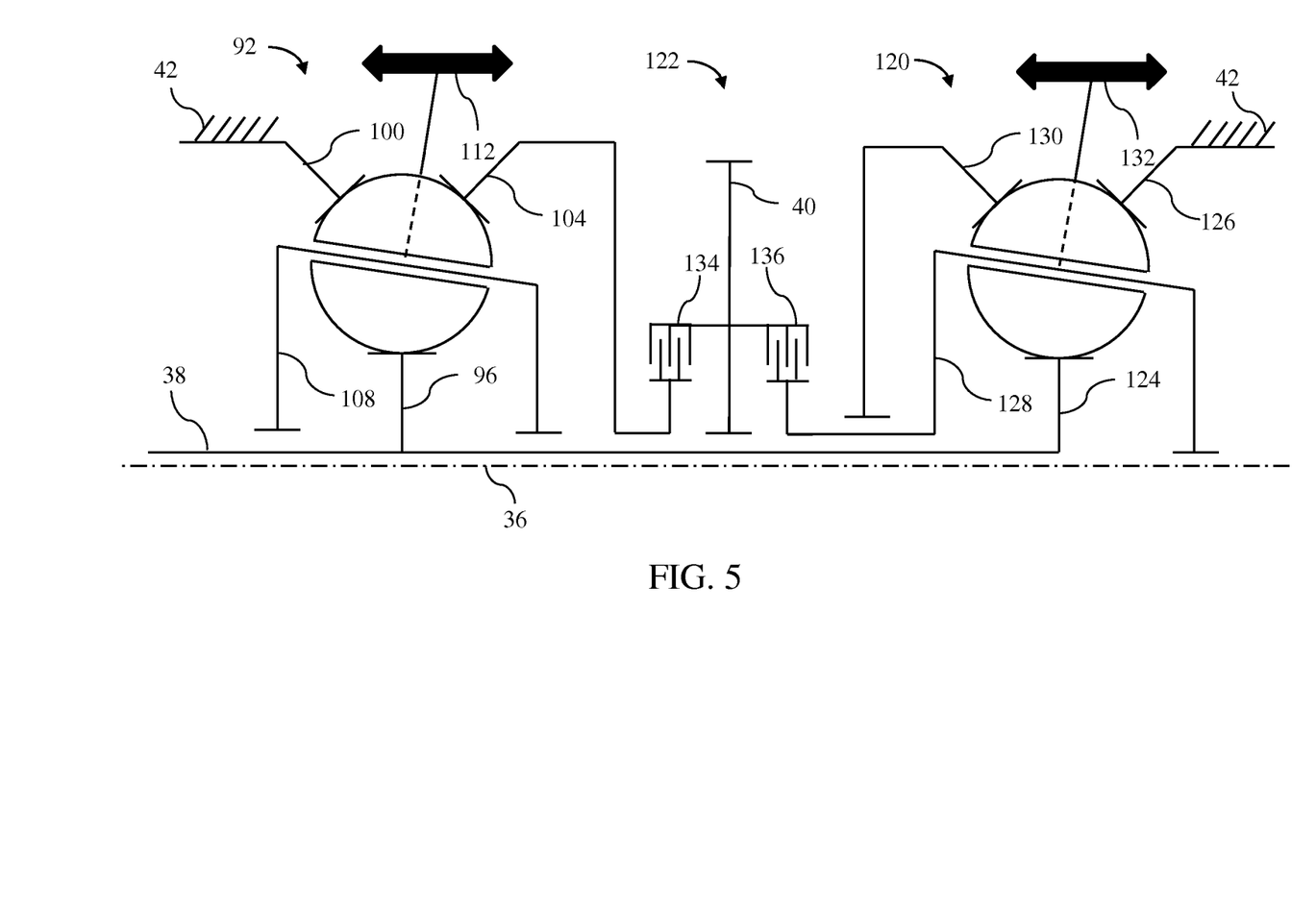
FIG. 5 is a schematic diagram of a fourth transmission gearing arrangement utilizing two ball variators and two clutches.

FIG. 5 illustrates a transmission gearing arrangement utilizing two ball variators 92 and 120 and a combining clutch module 122. Ball variator 92 is structured as described above. Inner race 124 of ball variator 120 is fixedly coupled to input shaft 38. Right outer race 126 of ball variator 120 is fixedly coupled to transmission case 42. Carrier 128 and left outer race 130 are supported for rotation about common axis 36. Since carrier 128 rotates, actuator 132 must act through an interface such as a fork and groove similar to the interface used to actuate manual transmission synchronizers. Output 40, supported for rotation about common axis 36, is selectively coupled to right outer race 104 by clutch 134 and is selectively coupled to carrier 128 by clutch 136. Clutches 134 and 136 may be a Switchable One-Way Clutches (SOWCs) having multiple operating states as commanded by a controller. If clutch 134 is a SOWC, the available states include at least a lock-lock state and a lock-free state. In the lock-lock state, output 40 and right outer race 104 are constrained to rotate at the same speed and torque may be transferred in either direction. In the lock-free state, torque may be transferred from right outer race 104 to output 40 while the speeds are equal but the clutch overruns with output 40 rotating faster as opposed to transferring torque in the opposite direction. If clutch 136 is a SOWC, the available states include at least a free-free state and a lock-free state and may also include a lock-lock state. In the free-free state, the speeds of output 40 and carrier 128 are not constrained by the clutch and no torque is transferred in either direction. In the lock-free state, torque may be transferred from carrier 128 to output 40 while the speeds are equal but the clutch overruns with output 40 rotating faster as opposed to transferring torque in the opposite direction. Alternatively, one or both of clutches 134 and 136 may be controllable friction clutches.

As described above, ball variator 92 establishes a continuous range of speed ratios between input shaft 38 and right outer race 104 with the speed ratio being dependent on the position of actuator 112. The range of speed ratios includes an infinite speed ratio in which right outer race 104 is stationary while input shaft 38 rotates. Ball variator 120 establishes a continuous range of speed ratios between input shaft 38 and carrier 128 with the speed ratio being dependent on the position of actuator 132. The range of speed ratios for ball variator 128 includes only positive underdrive speed ratios. By choosing suitable dimensions for ball variators 92 and 120, the respective ranges of speed ratios overlap for some transition range.

When the vehicle is stationary, clutch 134 is placed in the lock-lock state, clutch 136 is placed in the free-free state, and actuator 112 is positioned such that input shaft 38 is free to rotate without causing any rotation of right outer race 104. In this condition, the engine can idle with the vehicle stationary. To cause the vehicle to move forward, actuator 112 is moved slightly to the left, causing right outer race 104 and output 40 to rotate in the same direction as input shaft 38. As the vehicle speed increases, actuator 112 is moved further to the left such that the speed of input shaft 38 is less relative to the speed of output 40, allowing a relatively constant engine speed as the vehicle accelerates. To cause the vehicle to move backward from a stationary condition, actuator 112 is moved slightly to the right, causing right outer race 104 and output 40 to rotate in the opposite direction as input shaft 38. If clutch 134 is a friction clutch, an alternative launch procedure is available. In the alternative procedure, while the vehicle is stationary, clutch 134 is open and actuator 112 is positioned such that right outer race 104 rotates slowly in the desired direction. Then, to launch the vehicle, clutch 134 is gradually engaged.

When the speed ratio is in the transition range, a shift can be performed. Actuator 132 is positioned such that the speed of carrier 128 is slower than the speed of right outer race 104. Then, clutches 134 and 136 are both placed in lock-free states. Then, actuator 132 is adjusted such that the speed of carrier 128 is faster than the speed of right outer race 104. In response, torque is transferred from clutch 134 and ball variator 92 to clutch 136 and ball variator 120. After the torque transfer, clutch 136 may be placed in a lock-lock state if that is available. Any further speed ratio adjustments are performed by adjusting the position of actuator 132.

Figure 6:
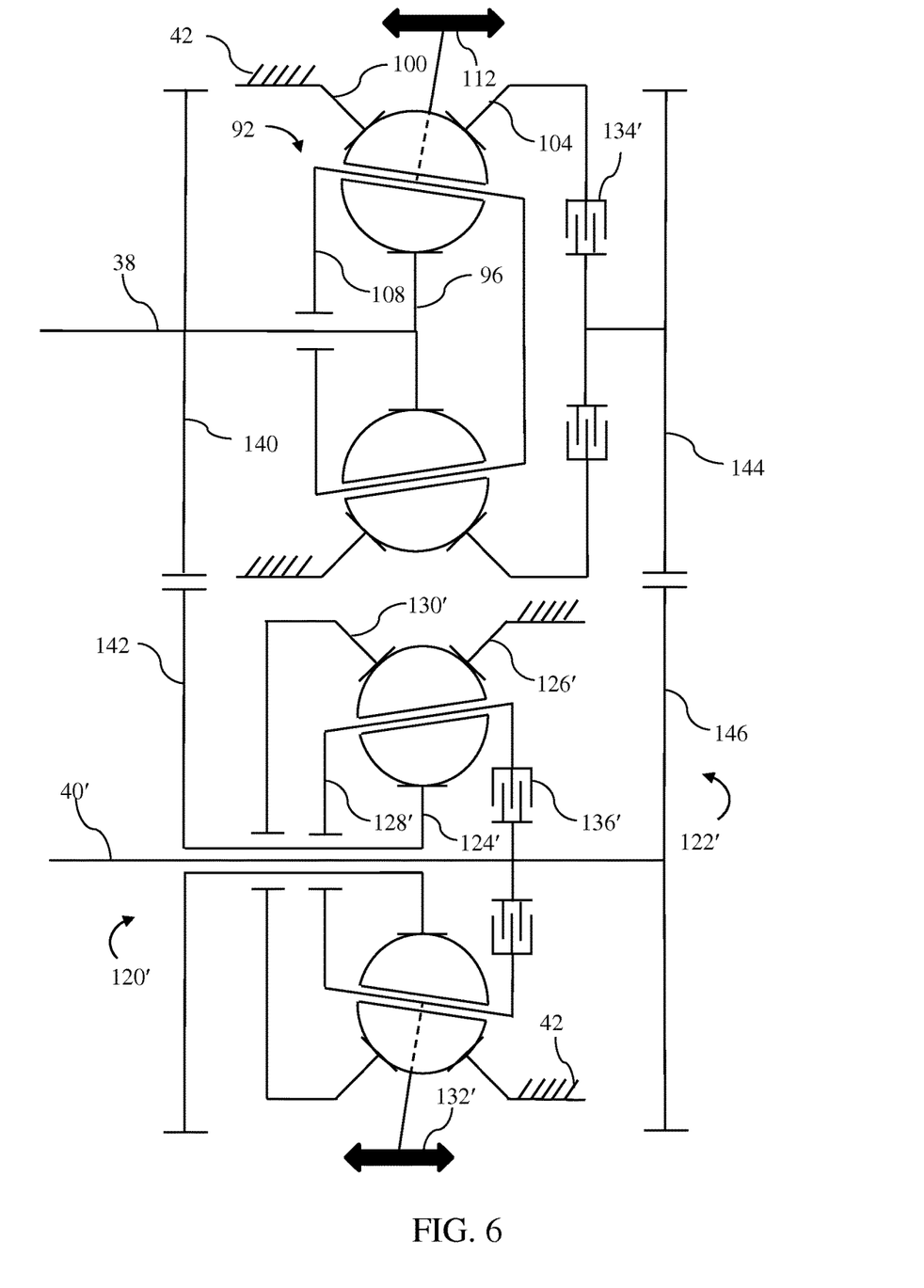
FIG. 6 is a schematic diagram of a fifth transmission gearing arrangement utilizing two ball variators, layshaft gearing, and two clutches.

FIG. 6 illustrates a modified version of the arrangement of FIG. 5. Components that are labeled with a prime (') are functionally analogous to the corresponding components in FIG. 5 but are arranged differently. Output shaft 40' is parallel to but offset from input shaft 38. The races and carrier of ball variator 120' are supported for rotation about output shaft 40'. Gear 140 is fixedly coupled to input shaft 38 and meshes with gear 142 which is fixedly coupled to inner race 124'. Therefore, inner race 124' is driveably connected to input shaft 38. Ball variator 120' still establishes a continuous range of speed ratios between input shaft 38 and carrier 128' with the speed ratio being dependent on the position of actuator 132'. However, the limits of this range are impacted by the tooth numbers of gears 140 and 142 in addition to the dimensions of the ball variator. Gear 144 is selectively coupled to right outer race 104 by clutch 134' and meshes with gear 146 which is fixedly coupled to output 40'. Therefore, clutch 134' selectively driveably connects right outer race 104 to output 40'. Gears 144 and 146, along with clutches 134' and 136', form clutch module 122'. Clutches 134' and 136' may be SOWCs as described above. The arrangement of FIG. 6 is operating in the same manner as the arrangement of FIG. 5.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   an input, output, first intermediate shaft, and second intermediate shaft supported for rotation about a common axis;
   a first gearing arrangement configured to establish an underdrive speed ratio between the input and the first intermediate shaft;
   a first ball variator configured to establish a continuous range of speed ratios between the input and the second intermediate shaft; and
   a second gearing arrangement configured to establish a linear speed relationship between the second intermediate shaft, the first intermediate shaft, and the output.

2. The transmission of claim 1 wherein the first gearing arrangement establishes a fixed underdrive speed relationship between the input and the first intermediate shaft.

3. The transmission of claim 2 wherein the first gearing arrangement comprises:
a sun gear fixedly held against rotation;
a ring gear fixedly coupled to the input;
a carrier fixedly coupled to the first intermediate shaft; and
a plurality of planet gears supported for rotation with respect to the carrier and meshing with both the sun gear and the ring gear.

4. The transmission of claim 1 wherein the first gearing arrangement comprises a second ball variator having a first outer race fixedly coupled to the input, a second outer race fixedly coupled to the first intermediate shaft, and a carrier fixedly held against rotation.

5. The transmission of claim 1 wherein the first gearing arrangement comprises a second ball variator having an inner race fixedly coupled to the input, a first outer race fixedly held against rotation, and a second outer race fixedly coupled to the first intermediate shaft.

6. The transmission of claim 1 wherein the first ball variator has a first outer race fixedly coupled to the input, a second outer race fixedly coupled to the second intermediate shaft, and a carrier fixedly held against rotation.

7. The transmission of claim 1 wherein the first ball variator has an inner race fixedly coupled to the input, a first outer race fixedly held against rotation, and a second outer race fixedly coupled to the second intermediate shaft.

8. The transmission of claim 1 wherein the second gearing arrangement comprises:
a sun gear fixedly coupled to the second intermediate shaft;
a ring gear fixedly coupled to the output;
a carrier fixedly coupled to the first intermediate shaft; and
a plurality of planet gears supported for rotation with respect to the carrier and meshing with both the sun gear and the ring gear.

9. A transmission comprising:
an input;
first and second intermediate shafts;
a first ball variator configured to establish a first continuous range of speed ratios between the input and the first intermediate shaft;
a second ball variator configured to establish a second continuous range of speed ratios between the input and the second intermediate shaft; and
a combining gearing arrangement configured to transfer power from the first and second intermediate shafts to an output.

10. The transmission of claim 9 wherein the first ball variator has a first outer race fixedly coupled to the input, a second outer race fixedly coupled to the first intermediate shaft, and a first carrier fixedly held against rotation.

11. The transmission of claim 10 wherein the second ball variator has a third outer race fixedly coupled to the input, a fourth outer race fixedly coupled to the second intermediate shaft, and a second carrier fixedly held against rotation.

12. The transmission of claim 9 wherein the first ball variator has a first inner race fixedly coupled to the input, a first outer race fixedly held against rotation, and a second outer race fixedly coupled to the first intermediate shaft.

13. The transmission of claim 12 wherein the second ball variator has a second inner race fixedly coupled to the input, a third outer race fixedly held against rotation, and a fourth outer race fixedly coupled to the second intermediate shaft.

14. The transmission of claim 12 wherein the second ball variator has a second inner race fixedly coupled to the input, a third outer race fixedly held against rotation, and a carrier fixedly coupled to the second intermediate shaft.

15. The transmission of claim 9 wherein the combining gearing arrangement comprises:
a sun gear fixedly coupled to the second intermediate shaft;
a ring gear fixedly coupled to the output;
a carrier fixedly coupled to the first intermediate shaft; and
a plurality of planet gears supported for rotation with respect to the carrier and meshing with both the sun gear and the ring gear.

16. The transmission of claim 9 wherein the combining gearing arrangement comprises:
a first clutch configured to selectively couple the first intermediate shaft to the output; and
a second clutch configured to selectively couple the second intermediate shaft to the output.

* * * * *